(12) United States Patent
Tong

(10) Patent No.: US 9,582,584 B2
(45) Date of Patent: Feb. 28, 2017

(54) METHOD, APPARATUS AND SYSTEM FOR FILTERING DATA OF WEB PAGE

(71) Applicant: Tencent Technology (Shenzhen) Company Limited, Shenzhen, Guangdong (CN)

(72) Inventor: Lei Tong, Guangdong (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 218 days.

(21) Appl. No.: 14/325,774

(22) Filed: Jul. 8, 2014

(65) Prior Publication Data

US 2014/0324892 A1 Oct. 30, 2014

Related U.S. Application Data

(63) Continuation of application No. PCT/CN2013/090994, filed on Dec. 31, 2013.

(30) Foreign Application Priority Data

Apr. 23, 2013 (CN) .......................... 2013 1 0142674

(51) Int. Cl.
*G06F 17/00* (2006.01)
*G06F 17/30* (2006.01)

(52) U.S. Cl.
CPC .............................. *G06F 17/30867* (2013.01)

(58) Field of Classification Search
CPC ..... G06F 2209/545; G06F 9/542; G06F 9/546
See application file for complete search history.

(56) References Cited

U.S. PATENT DOCUMENTS

2007/0174424 A1 7/2007 Chen et al.
2007/0271519 A1* 11/2007 Hu .......................... G06Q 10/10
715/745

FOREIGN PATENT DOCUMENTS

CN 1713573 12/2005
CN 10149620 4/2009
CN 102447688 5/2012
(Continued)

OTHER PUBLICATIONS

International Search Report and Written Opinion issued in corresponding application PCT/CN2013/090994, dated Mar. 20, 2014, 5 pages.
(Continued)

*Primary Examiner* — Truong Vo
(74) *Attorney, Agent, or Firm* — Brinks, Gilson & Lione

(57) ABSTRACT

A method, an apparatus and a system for filtering data of a web page are described. According to embodiments of the invention, a data request message sent through a browser is received, a corresponding Application Programming Interface is invoked based on the data request message. The Application Programming Interface includes a HOOK function, and the data request message is filtered by using the HOOK function in the Application Programming Interface. Since almost all kinds of browsers may utilize Application Programming Interface(s) for requesting data, the solution has good compatibility, no specific plug-ins need to be developed for various browsers, no post-maintenance is required, the workload of development is small and the implementation is flexible.

9 Claims, 8 Drawing Sheets

(56) References Cited

FOREIGN PATENT DOCUMENTS

CN   102932375   2/2013
CN   102957698   3/2013

OTHER PUBLICATIONS

Office Action issued in corresponding application CN 201310142674.0, dated Feb. 11, 2015, pp. 1-8.

* cited by examiner

METHOD, APPARATUS AND SYSTEM FOR FILTERING DATA OF WEB PAGE

The present application claims priority to and is a continuation of PCT/CN2013/090994, filed on Dec. 31, 2013 and entitled "METHOD, APPARATUS AND SYSTEM FOR FILTERING DATA OF WEB PAGE", which claims the priority to Chinese Patent Application No. 201310142674.0, entitled "METHOD, APPARATUS AND SYSTEM FOR FILTERING DATA OF WEB PAGE", filed on Apr. 23, 2013 with State Intellectual Property Office of People's Republic of China, which is incorporated herein by reference in its entirety.

TECHNICAL FIELD

The disclosure relates to communication technologies, and in particular, to a method, an apparatus and a system for filtering data of a web page.

BACKGROUND

A browser is a client program for browsing Internet-based services. The browser may send various requests to an Internet server, which, in response to the requests, sends e.g., hypertext information and various multimedia data to the client. The browser then parses, displays and play, e.g., the hypertext information and the various multimedia data. The browser allows a user to browse various data provided by the Internet, e.g., a web page, a video, etc. During browsing, some unwelcomed advertisements, pop-up advertisements, etc., may be also provided together with the data requested by the user, thereby interfering with normal browsing operation of the user. The user may be annoyed by the unwelcomed webpage advertisements, pop-up advertisements, etc.

At present, the data of the web page is generally filtered by loading a plug-in in the browser, for intercepting e.g., advertisement. However, since different browsers have different characteristics, the same plug-in may not be applicable to various browsers. Therefore, various plug-ins need to be developed for the various browsers.

SUMMARY

A method, an apparatus and a system for filtering data of a web page are provided.

In one aspect, a method for filtering data of a web page, comprising:

receiving a data request message sent through a browser; invoking a corresponding Application Programming Interface based on the data request message, wherein the application programming interface comprises a HOOK function; and filtering the data request message by the HOOK function in the Application Programming Interface.

In another aspect, the method for filtering the data of the web page includes:

determining an Application Programming Interface invoked by a data request message, wherein the application programming interface comprises a HOOK function;

determining, based on the HOOK function in the Application Programming Interface, data requested by the data request message; and filtering the data requested by the data request message.

In yet another aspect, an apparatus for filtering data of a web page, comprising:

a receiving unit, configured to receive a data request message sent through a browser;

an invoking unit, configured to invoke a corresponding Application Programming Interface based on the data request message, wherein the Application Programming Interface comprises a HOOK function; and a filtering unit, configured to filter the data request message with the HOOK function in the Application Programming Interface.

In still another aspect, the apparatus for filtering the data of the web page includes:

a first determining unit, configured to determine an Application Programming Interface invoked by a data request message, wherein the Application Programming Interface comprises a HOOK function;

a second determining unit, configured to determine, based on the HOOK function in the Application Programming Interface, data requested by the data request message; and a filtering unit, configured to filter the data requested by the data request message.

A communication system includes any apparatus for filtering the data of the web page according to the embodiments of the invention.

According to the embodiments of the invention, the data requested by the data request message is filtered according the HOOK function in the Application Programming Interface invoked by the data request message. Since almost all kinds of browsers may utilize Application Programming Interface(s) for requesting data, the method and apparatus according to the present disclosure are compatible with all types of plug-ins. No specific plug-ins need to be developed for a specific type of browser, and no post-maintenance is required. Therefore, the workload of development is small and the implementation is flexible.

BRIEF DESCRIPTION OF THE DRAWINGS

Drawings attached to the description of embodiments are exemplary only for understanding of the technical solutions in the embodiments of the invention. Apparently, the drawings show only some of the embodiments of the invention. Other drawings can be obtained by those skilled in the art based on the drawings without inventive efforts.

FIG. 5b is a schematic structure diagram of the filtering unit in the apparatus for filtering data of a web page as shown in FIG. 5a.

DETAILED DESCRIPTION

The technical solution according to embodiments of the invention is described clearly and completely hereinafter in conjunction with drawings. Apparently, the described embodiments are merely some embodiments of the invention, rather than all the embodiments. Any other embodiments obtained based on the embodiments in the invention by those skilled in the art without any creative works shall fall in the scope of the present disclosure.

A method for filtering data of a web page, an apparatus and a system thereof are provided according to the embodiments of the invention, where the method, the apparatus and the system are explained in detail respectively hereinafter.

Figure 1A:
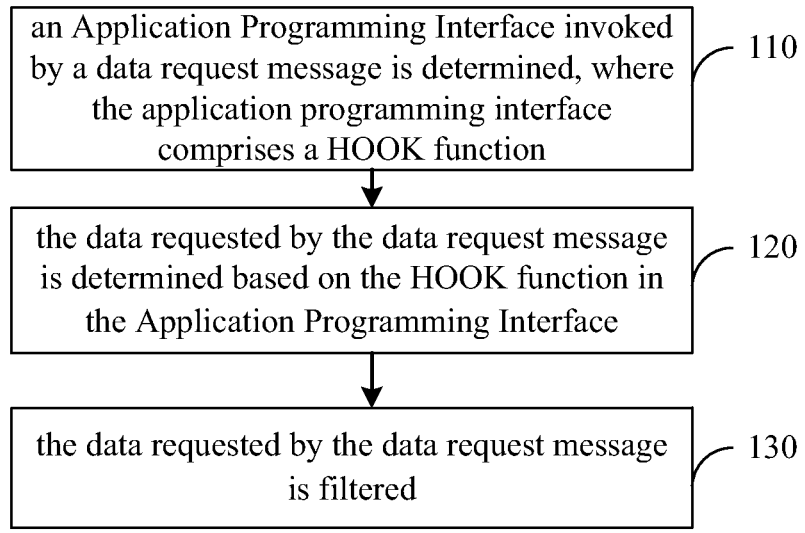
FIG. 1a is a flow chart of a method for filtering data of a web page according to an embodiment of the invention.

As shown in FIG. 1a, according to an embodiment of the present invention, a method for filtering data of a web page includes the following steps:

In step 110, an Application Programming Interface invoked by a data request message is determined, where the application programming interface comprises a HOOK function. In step 120, the data requested by the data request message is determined based on the HOOK function in the Application Programming Interface. In step 130, the data requested by the data request message is filtered.

The filtering of the data may be performed according to a preset rule, a rule determined by the user, or any other criteria, and the disclosure is not limited in this aspect.

It should be noted that, the Application Programming Interface is a predefined function for enabling an application program or a developer to access a group of routines based on a software or hardware without accessing source codes or understanding details of the inner operational mechanism. The HOOK function is a part of the message processing mechanism. The Application Programming Interface includes the HOOK function. For example, codes of the HOOK function may be added in the head of codes of the Application Programming Interface.

Figure 1B:
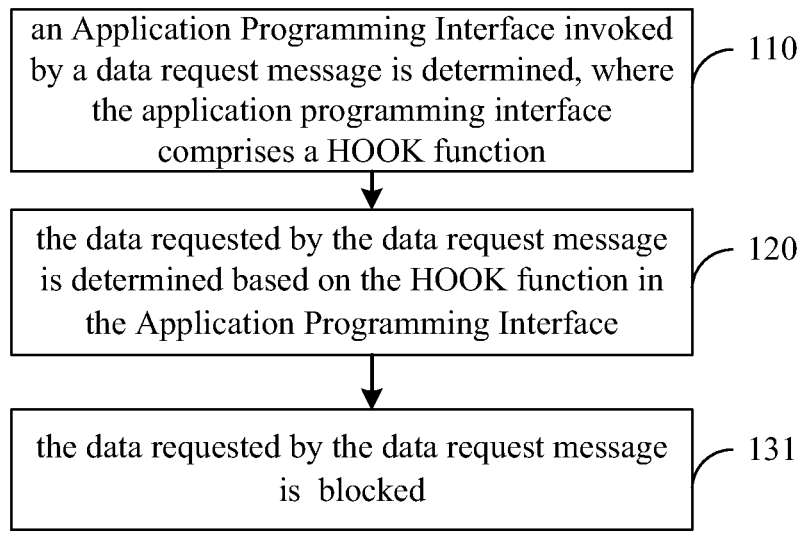
FIG. 1b is a flow chart of a method for filtering data of a web page according to an embodiment of the invention.

As shown in FIG. 1b, the step 130 of filtering the data requested by the data request message may further include the step 131 of blocking the data requested by the data request message.

Figure 1C:
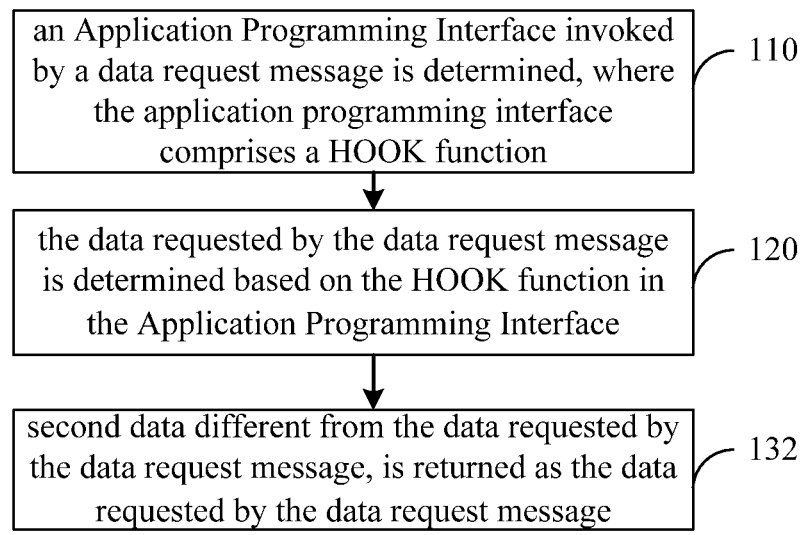
FIG. 1c is a flow chart of a method for filtering data of a web page according to an embodiment of the invention.

As shown in FIG. 1c, the step 130 of filtering the data requested by the data request message may further include the step 132 of returning, in response to the data request message, second data different from the data requested by the data request message, as the data requested by the data request message.

In an exemplary implementation, the second data may be a blank file.

For the method according to the embodiment of the present invention, no post-maintenance is necessary, the workload of development is small, and the implementation is flexible.

Embodiment 1

The present embodiment is directed to an apparatus for filtering the data of the web page. The apparatus for filtering the data of the web page may be integrated in a client, where the client may be installed in a terminal such as a smart phone, a tablet computer, an e-book reader, a MP3 (Moving Picture Experts Group Audio Layer III) player, a MP4 (Moving Picture Experts Group Audio Layer IV) player, a laptop, a desktop, etc.

The method for filtering the data of the web page includes: receiving a data request message sent through a browser; invoking a corresponding Application Programming Interface based on the data request message, where the application programming interface includes a HOOK function; and filtering the data request message with the HOOK function in the Application Programming Interface.

According to some exemplary embodiments of the disclosure, the web page may be parsed via a browser, parsed remotely via a server, parsed over the cloud via a cloud server or the like, and the present disclosure is not limited in this aspect. According to some exemplary embodiments of the disclosure, the web page may be a static page or a dynamic page, the parsed web page may be in the format of HTML (hypertext mark-up language), XML (eXtensible Markup Language), JSP (Java Server Page), ASP (Active Server Page), CSS (Cascading Style Sheet), PHP (Hypertext Preprocessor) or the like, and the present disclosure is not limited in this aspect.

Figure 2A:
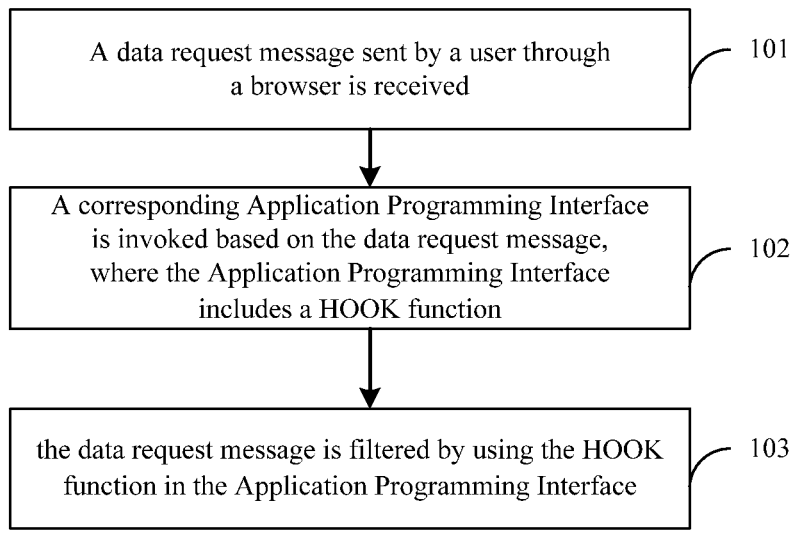
FIG. 2a is a flow chart of a method for filtering data of a web page according to an embodiment of the invention.

As shown in FIG. 2a, specific steps of the method are described as follows.

Step 101: receiving the data request message sent through the browser by the user, where the data request message may be used for requesting the webpage to display various resource files.

The data request message may specifically be a link address, e.g., a Uniform Resource Locator (URL), etc.

Step 102: invoking the corresponding Application Programming Interface (API), e.g., API of "send", "recv", etc., based on the data request message received in step 101.

The Application Programming Interface includes the HOOK function. For example, codes of the HOOK function may be added in the head of codes of the Application Programming Interface.

It should be noted that, the Application Programming Interface is a predefined function for enabling an application program or a developer to access a group of routines based on a software or hardware without accessing source codes or understanding details of the inner operational mechanism. The HOOK function is a part of the message processing mechanism and the application program may filter various messages and events by setting "hooks", for which the description is omitted.

Step 103: filtering the data request message with the HOOK function in the Application Programming Interface.

There are various approaches for filtering. For example, if it is detected that data requested by the data request message is data preset to be intercepted, the data request message may be directly blocked or a blank file to replace the data originally requested by the data request message may be returned. The filtering may be described in the following examples.

(1) When it is determined through the HOOK function in the Application Programming Interface that, the data requested by the data request message is the data preset to be intercepted, the data request message is blocked.

The data to be intercepted may be set as required. For example, it may be set as an advertisement link, a game link or a link to install any unknown plug-in, etc.

Taking advertisement interception as an example, when it is determined through the HOOK function in the Application Programming Interface that the data requested by the data request message is an advertisement link, the data request message may be blocked directly.

(2) When it is determined through the HOOK function in the Application Programming Interface that, the data requested by the data request message is the data preset to be intercepted, a blank file is returned in response to the data request message, to be taken as the data requested by the data request message.

The data to be intercepted may be set as required. For example, it may be set as an advertisement link, a game link or a link to install any unknown plug-in, etc.

Taking advertisement interception as an example, when it is determined through the HOOK function in the Application Programming Interface that the data requested by the data request message is an advertisement link (e.g., a JS file, an SWF file, etc.), a blank file may be returned in response to the data request message, to be taken as the data requested by the data request message, i.e., to replace the advertisement data originally requested by the data request message. In this way, the browser may presume that the advertisement data is already downloaded; hence, the advertisement data is intercepted.

(3) Optionally, in order to improve the flexibility and user experience, the approach for filtering may vary depending on the type of the data requested by the data request message. For example, the filtering may include: A: blocking the data request message, when it is determined through the HOOK function in the Application Programming Interface that, the data requested by the data request message is a first type of data preset to be intercepted; and B: returning, in response to the data request message, a blank file as the data requested by the data request message, when it is determined through the HOOK function in the Application Programming Interface that, the data requested by the data request message is a second type of data preset to be intercepted.

The data to be intercepted may be set as required. For example, it may be set as an advertisement link, a game link or a link to install any unknown plug-in, etc.

Still taking advertisement interception as an example, the first type of data to be intercepted may be set as "a non-image advertisement link" and the second type of data to be intercepted may be set as "an image advertisement link". Accordingly, the filtering may include: blocking the data request message, when it is determined through the HOOK function in the Application Programming Interface that, the data requested by the data request message is the non-image advertisement link; and returning, in response to the data request message, a blank image file as the data requested by the data request message, when it is determined through the HOOK function in the Application Programming Interface that, the data requested by the data request message is the image advertisement link. In other words, the advertisement image originally requested by the data request message is replaced with the blank image file. In this way, the browser may presume that the advertisement image is already downloaded. Hence, the advertisement image is intercepted.

It should be noted that, if it is detected that the data requested by the data request message is not the data preset to be intercepted, proceed to obtain the requested data based on the data request message, for which the description is omitted.

In addition, in order to improve the user experience, the user may be notified os the result of filtering. For example, the user may be notified of the object of filtering, detailed information of filtering, etc. In other words, after the step of "filtering the data request message with the HOOK function in the Application Programming Interface", the method for filtering the data of the web page may further include: returning the result of filtering to the user.

Taking advertisement interception as an example, the result of filtering, e.g., the result of interception, detailed information of interception, etc. may be returned to the user in order for the user to determine whether the interception is reasonable, and to further view the result of filtering by means of, e.g., viewing logs, for which the description is omitted.

Accordingly, according to the embodiment of the invention, the data request message sent through the browser by the user is received, the corresponding Application Programming Interface is invoked based on the data request message, where the Application Programming Interface includes the HOOK function, and the data request message is filtered by using the HOOK function in the Application Programming Interface. Since almost all kinds of browsers may utilize Application Programming Interface(s) for requesting data, the method and apparatus of the present disclosure are compatible with and applicable to all kinds of browsers. No specific plug-ins need to be developed for a specific type of browsers. No post-maintenance is required. Therefore, the workload of development is small and the implementation is flexible.

Detailed explanation is further given in the following according to embodiments 2, 3 and 4 based on the method described in embodiment 1.

Embodiment 2

Advertisement interception is taken as an example in the description of this embodiment.

Figure 2B:
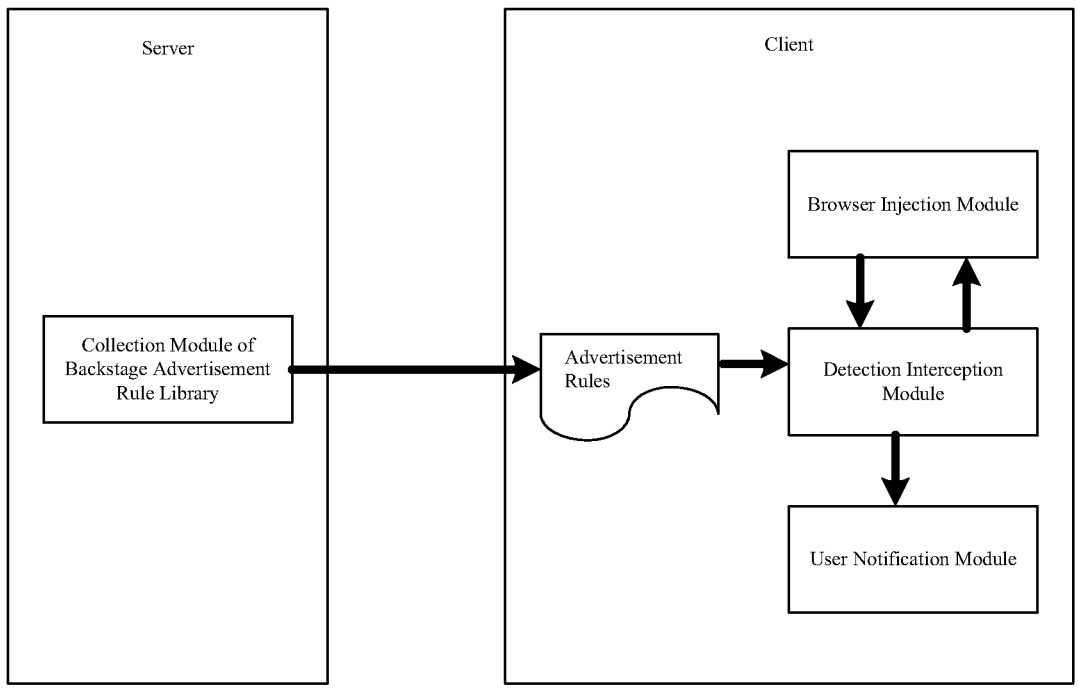
FIG. 2b is a schematic diagram of an exemplary apparatus for filtering data of a web page according to an embodiment of the invention.

As shown in FIG. 2b, the apparatus for filtering the data in the browser may be a client, e.g., a browser, where the client may be installed in a terminal The client may include a browser injection module, a detection and interception module and a user notification module. According to the embodiment of the disclosure, functions of the modules may be described as follows.

(1) the browser injection module is mainly configured to suspend a request of a browser immediately after receiving a data request message from the browser, forward the data request message to the detection and interception module to determine whether data requested by the data request message is an advertisement link, wait for a result of detection returned from the detection and interception module, and directly block the data request message if the result of the detection indicates that the data requested by the data request message is the advertisement link (e.g., a JS file or an SWF file, etc.).

(2) the detection and interception module is mainly configured to, receive the data request message, e.g., an URL, forwarded by the browser injection module, invoke a corresponding Application Programming Interface, determine according to an advertisement rule library whether the data request message is an advertisement link, and return the result of the detection to the browser injection module.

It should be noted that, all criteria/standards for determination are stored in the advertisement rule library. Consequently when the system starts, the detection and interception module is required to parse the advertisement rule library, and detect update of the advertisement rule library, i.e., request for a new version of the advertisement rule library, then the advertisements may be more accurately intercepted.

The advertisement rule library may be stored in a server and maintained by the server. For example, a collection module of backstage advertisement rule library may be provided in the server, where this collection module is configured to perform routine analysis on source codes of URLs, extract the advertisement link(s) from the URLs, generate advertisement rule(s) and issue the advertisement rule(s) to the client for the use by the detection and interception module.

(3) the user notification module is mainly configured to notify a user of the result and detailed information of the interception in order for the user to determine whether the interception is reasonable after the detection and interception module intercepts an advertisement. The information about the interception may be reviewed by the user at a later time, by means of, for example, viewing logs.

Figure 2C:
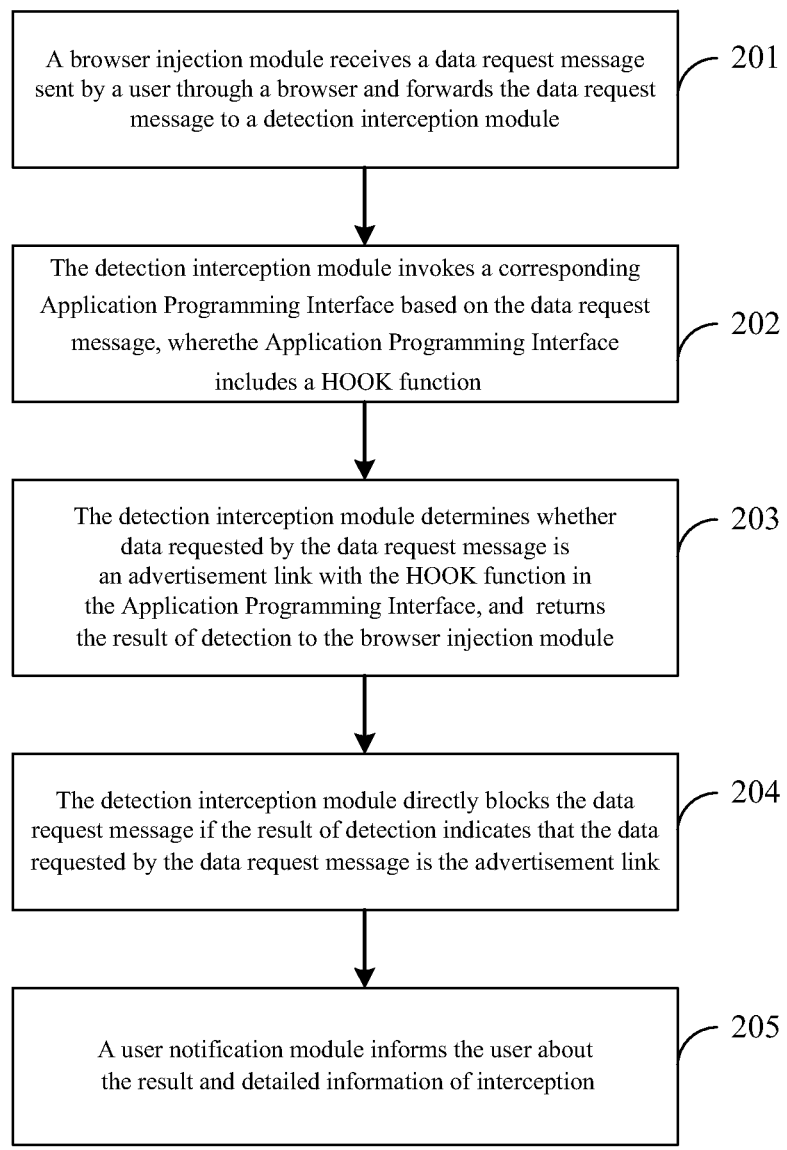
FIG. 2c is a flow chart of a method for filtering data of a web page according to another embodiment of the invention.

A method for filtering data of a web page is shown in FIG. 2c, which is based on the structure of the above described client, and specific steps of this method may be described as follows.

Step 201: receiving the data request message, e.g., the URL, sent through the browser by the user and forwarding the data request message to the detection and interception module, by the browser injection module.

The data request message may be used for requesting a web page to display various resource files.

The browser injection module suspends the request of the data request message immediately after receiving the data request message, forwards the data request message to the detection and interception module to determine whether the data requested by the data request message is an advertisement link, and waits for the result of detection returned from the detection and interception module.

Step 202: invoking the corresponding Application Programming Interface by the detection and interception module based on the data request message received in step 201.

The Application Programming Interface includes a HOOK function, for example, codes of the HOOK function may be added in the head of codes of the Application Programming Interface.

Step 203: determining, by the detection and interception module, whether the data requested by the data request message is an advertisement link, through the HOOK function in the Application Programming Interface; returning the result of detection indicating that the data requested by the data request message is the advertisement link to the browser injection module if the result of determination is positive; returning the result of detection indicating that the data requested by the data request message is not the advertisement link to the browser injection module if the result of determination is negative.

Step 204: receiving, by the browser injection module, the result of detection; directly blocking the data request message if the result of detection indicates that the data requested by the data request message is the advertisement link, where the user may further be notified of the result and detailed information of interception; continuing to execute the request of the data request message if the result of detection indicates that the data requested by the data request message is not the advertisement link.

Step 205: optionally, receiving, by the user notification module, the result and detailed information of interception sent by the browser injection module and notifying, by the user notification module, the user of the result and detailed information of interception in order for the user to determine whether the interception is reasonable.

Subsequently the user may review the information of interception by means of, for example, viewing logs.

Accordingly, according to the embodiment of the invention, the data request message sent through the browser by the user is received, the corresponding Application Programming Interface is invoked based on the data request message, where the Application Programming Interface includes the HOOK function, the data request message is directly blocked when it is determined through the HOOK function in the Application Programming Interface that the data requested by the data request message is the advertisement link, hence the advertisement is intercepted. Since almost all kinds of browsers may utilize Application Programming Interface(s) for requesting data, the solution has good compatibility, no specific plug-ins need to be developed for various browsers, no post-maintenance is required. Therefore, the workload of development is small and the implementation is flexible.

Embodiment 3

Same as embodiment 2, advertisement interception is taken as an example in the description of embodiment 3. When the data requested by the data request message is the advertisement link, an approach of directly blocking the data request message is applied according to embodiment 2. In contrast, another approach, i.e., responding the data request message with a blank file as the data requested by the data request message, is applied according to this embodiment, for which the detail is explained in the following.

As shown in FIG. 2b, a client, which has the same structure as the client according to embodiment 2, may include a browser injection module, a detection and interception module and a user notification module. According to this embodiment, functions of all the modules may be described as follows.

(1) the browser injection module is mainly configured to suspend a request of a browser immediately after receiving a data request message, forward the data request message to the detection and interception module to determine whether data requested by the data request message is an advertisement link, wait for a result of detection returned from the detection and interception module, and return a blank file with a small data volume to the browser as the data requested by the data request message if the result of the detection indicates that the data requested by the data request message is the advertisement link (e.g., a JS file or an SWF file, etc.).

(2) the detection and interception module is mainly configured to, receive the data request message, e.g., an URL, forwarded by the browser injection module, invoke a corresponding Application Programming Interface, determine according to an advertisement rule library whether the data request message is an advertisement link, and return the result of the detection to the browser injection module.

It should be noted that, all criteria/standards for the determination are stored in the advertisement rule library. Consequently, when the system starts, the detection and interception module is required to parse the advertisement rule library, and detect update of the advertisement rule library, i.e., request for a new version of the advertisement rule library, then advertisements may be intercepted more accurately.

The advertisement rule library may be stored in a server and maintained by the server. For example, a collection module of backstage advertisement rule library may be provided in the server, where this collection module is configured to perform routine analysis on source codes of URLs, extract the advertisement link(s) from the URLs, generate advertisement rule(s) and issue the advertisement rule(s) to the client for the use by the detection and interception module.

(3) the user notification module is mainly configured to notify a user about the result and detailed information of the interception in order for the user to determine whether the interception is reasonable, after the detection and interception module intercepts an advertisement. The information of interception may be reviewed by the user at a later time, by means of, for example, viewing logs.

Figure 3:
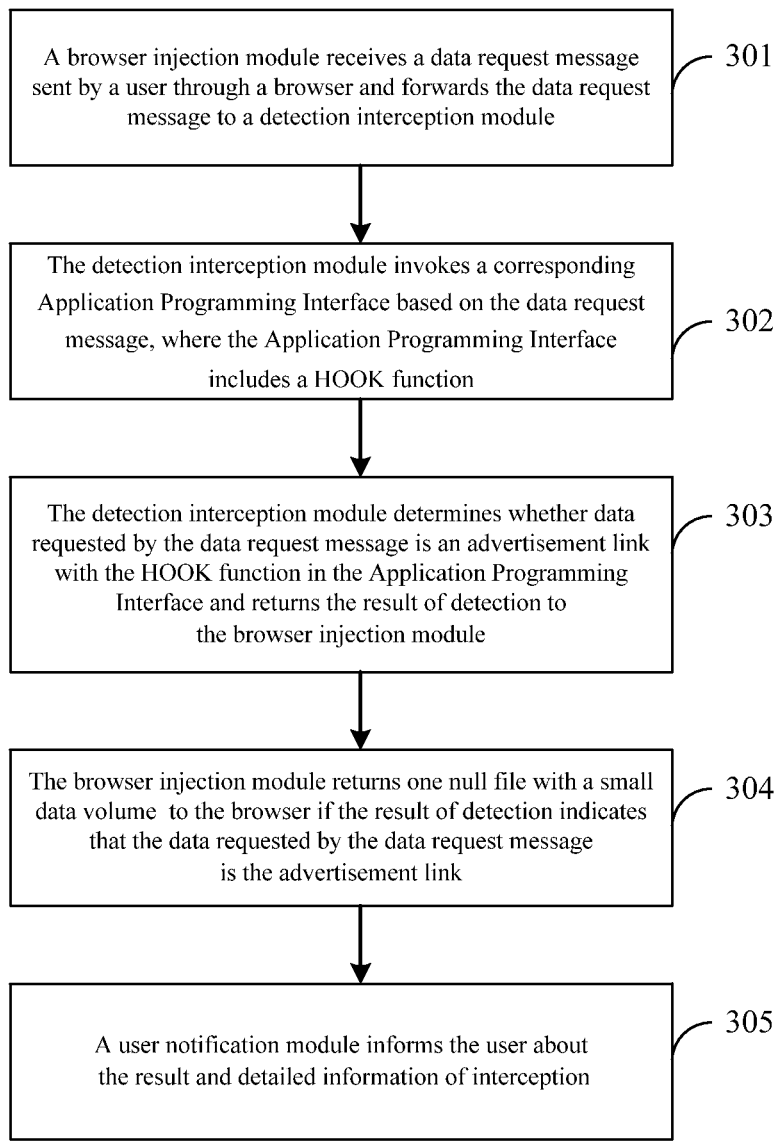
FIG. 3 is a flow chart of a method for filtering data of a web page according to yet another embodiment of the invention.

A method for filtering data of a web page is shown in FIG. 3, which is based on the structure of the above described client, and specific steps of this method may be described as follows.

Step 301: receiving the data request message, e.g., the URL, sent through the browser by the user and forwarding the data request message to the detection and interception module, by the browser injection module.

The data request message may be used for requesting a web page to display various resource files.

For example, the browser injection module suspends the request of the browser immediately after receiving the data request message, forwards the data request message to the detection and interception module to determine whether the data requested by the data request message is an advertisement link, and waits for the result of detection returned from the detection and interception module.

Step 302: invoking the corresponding Application Programming Interface by the detection and interception module based on the data request message received in step 301.

The Application Programming Interface includes a HOOK function, for example, codes of the HOOK function may be added in the head of codes of the Application Programming Interface.

Step 303: determining, by the detection and interception module, whether the data requested by the data request message is an advertisement link, through the HOOK function in the Application Programming Interface; returning the result of detection indicating that the data requested by the data request message is the advertisement link to the browser injection module if the result of determination is positive; returning the result of detection indicating that the data requested by the data request message is not the advertisement link to the browser injection module if the result of determination is negative.

Step 304: receiving, by the browser injection module, the result of detection; returning a blank file with a small data volume (for example, a blank image file) to the browser as the data requested by the data request message if the result of detection indicates that the data requested by the data request message is the advertisement link, where the user may further be informed about the result and detailed information of interception; continuing to execute the request of the data request message if the result of detection indicates that the data requested by the data request message is not the advertisement link.

Step 305: optionally, receiving, by the user notification module, the result and detailed information of the interception sent by the browser injection module and notifying, by the user notification module, the user of the result and detailed information of interception so that the user may determine whether the interception is reasonable.

Subsequently the user may review the interception information by means of, for example, viewing logs.

Accordingly, according to the embodiment of the invention, the data request message sent through the browser by the user is received, the corresponding Application Programming Interface is invoked based on the data request message, where the Application Programming Interface includes the HOOK function, a blank file is returned to the browser to replace the data originally requested by the data request message when it is determined through the HOOK function in the Application Programming Interface that the data requested by the data request message is the advertisement link, hence the advertisement is intercepted; since almost all kinds of browsers may utilize Application Programming Interface(s) for requesting data, the solution has good compatibility, no specific plug-ins need to be developed for various browsers, no post-maintenance is required, the workload of development is small and the implementation is flexible.

Embodiment 4

In order to further improve the flexibility and user experience based on embodiment 2 and embodiment 3, various approaches for filtering may further be applied based on the type of the data requested by the data request message. In the following the description is made by still taking advertisement interception as an example.

As shown in FIG. 2b, a client, which has the same structure as the client according to embodiment 2 and embodiment 3, may include a browser injection module, a detection and interception module and a user notification module. According to this embodiment, functions of all the modules may be as follows.

(1) the browser injection module is mainly configured to suspend a request of the browser immediately after receiving a data request message, forward the data request message to the detection and interception module to determine whether data requested by the data request message is an advertisement link, wait for the result of detection returned from the detection and interception module, directly block the data request message if the result of the detection indicates that the data requested by the data request message is a non-image advertisement link, and return a blank file with a small data volume to the browser as the data requested by the data request message if the result of the detection indicates that the data requested by the data request message is an image advertisement link.

(2) the detection and interception module is mainly configured to, receive the data request message, e.g., an URL, forwarded by the browser injection module, invoke a corresponding Application Programming Interface, determine according to an advertisement rule library whether the data request message is an advertisement link, determine the type of the advertisement link, e.g., an image link, a non-image link, etc., and return the result of the detection to the browser injection module.

It should be noted that, all criteria/standards for the determination are in the advertisement rule library. Consequently, when a system starts, the detection and interception module is required to parse the advertisement rule library, and detect update of the advertisement rule library, i.e., request for a new version of the advertisement rule library, then the interception of advertisements may be performed more precisely.

The advertisement rule library may be stored in a server and maintained by the server. For example, a collection module of backstage advertisement rule library may be provided in the server, where this collection module is configured to perform routine analysis on source codes of URLs, extract the advertisement link(s) from the URLs, generate advertisement rule(s) and issue the advertisement rule(s) to the client for the use by the detection and interception module.

(3) the user notification module is mainly configured to, once the detection and interception module intercepts an advertisement, notify a user about the result and detailed information of the interception in order for the user to determine whether the interception is reasonable. The information of interception may be reviewed by the user at a later time, by means of, for example, viewing logs.

Figure 4:
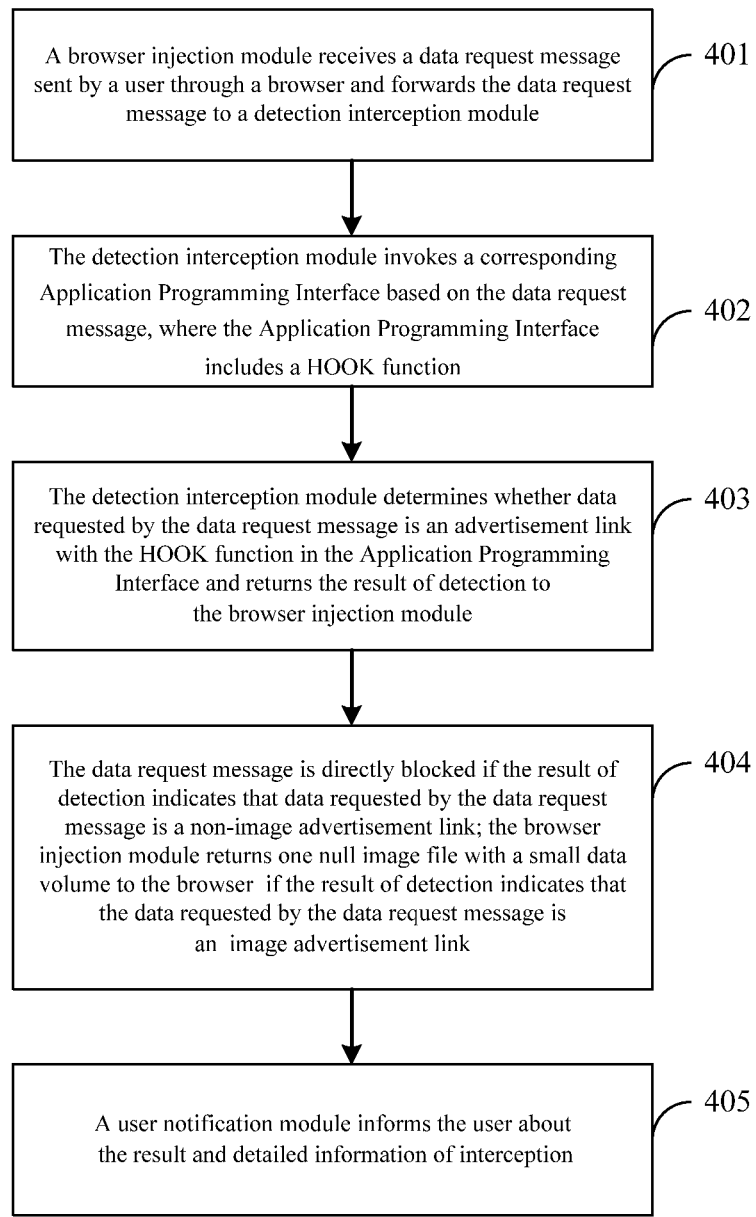
FIG. 4 is a flow chart of a method for filtering data of a web page according to yet another embodiment of the invention.

A method for filtering data of a web page is shown in FIG. 4, which is based on the structure of the above described client, and specific steps of this method may be described as follows.

Step 401: receiving the data request message, e.g., the URL, sent through the browser by the user and forwarding the data request message to the detection and interception module, by the browser injection module.

The data request message may be used for requesting a web page to display various resource files.

For example, the browser injection module suspends the request of the browser immediately after receiving the data request message, forwards the data request message to the detection and interception module to determine whether the data requested by the data request message is an advertisement link, and waits for the result of detection returned from the detection and interception module.

Step 402: invoking the corresponding Application Programming Interface by the detection and interception module based on the data request message received in step 401.

The Application Programming Interface includes a HOOK function, for example, codes of the HOOK function may be added in the head of codes of the Application Programming Interface.

Step 403: determining, by the detection and interception module, whether the data requested by the data request message is an advertisement link, through the HOOK function in the Application Programming Interface; returning the result of detection indicating that the data requested by the data request message is the advertisement link to the browser injection module if the result of determination is positive, where the type of the advertisement link, e.g., an image link or a non-image link, etc., is indicated in the result of detection; returning the result of detection indicating that the data requested by the data request message is not the advertisement link to the browser injection module if the result of determination is negative.

Step 404: receiving, by the browser injection module, the result of detection; directly blocking the data request message if the result of detection indicates that the data requested by the data request message is the non-image advertisement link; returning a blank image file with a small data volume to the browser as the data requested by the data request message if the result of detection indicates that the data requested by the data request message is the image advertisement link, where the user may further be informed about the result and detailed information of interception; continuing to execute the request of the data request message if the result of detection indicates that the data requested by the data request message is not the advertisement link.

Step 405: optionally, receiving, by the user notification module, the result and detailed information of the interception sent by the browser injection module and notifying, by the user notification module, the user of the result and detailed information of interception in order for the user to determine whether the interception is reasonable.

Subsequently the user may review the interception information by means of, for example, viewing logs.

Accordingly, according to the embodiment of the invention, the data request message sent through the browser by the user is received, the corresponding Application Programming Interface is invoked based on the data request message, where the Application Programming Interface includes the HOOK function, the data request message is directly blocked when it is determined through the HOOK function in the Application Programming Interface that the data requested by the data request message is the non-image advertisement link, while a blank file is returned to the browser to replace the data originally requested by the data request message when it is determined that the data requested by the data request message is the image advertisement link, hence the advertisement is intercepted; since almost all kinds of browsers may utilize Application Programming Interface(s) for requesting data, the solution has good compatibility, no specific plug-ins need to be developed for various browsers, no post-maintenance is required, the workload of development is small and the implementation is flexible.

Furthermore, in the solution, since various approaches for filtering may be applied based on the type of the data requested by the data request message, the flexibility and user experience may be improved significantly.

Embodiment 5

Figure 5A:
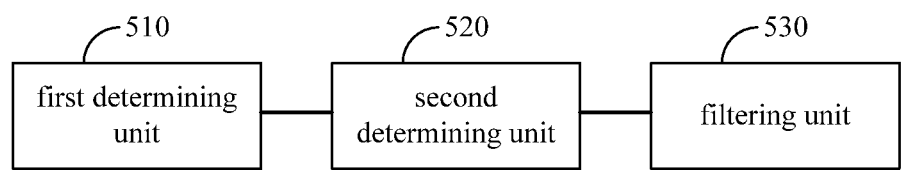
FIG. 5a is a schematic structure diagram of an apparatus for filtering data of a web page according to an embodiment of the invention.

According to an embodiment of the disclosure, an apparatus for filtering data of a web page is provided. As shown in FIG. 5a, the apparatus for filtering data of a web page includes: a first determining unit 510, configured to determine an Application Programming Interface invoked by a data request message, wherein the Application Programming Interface comprises a HOOK function; a second determining unit 520, configured to determine, based on the HOOK function in the Application Programming Interface, data requested by the data request message; and a filtering unit 530, configured to filter the data requested by the data request message.

Figure 5B:
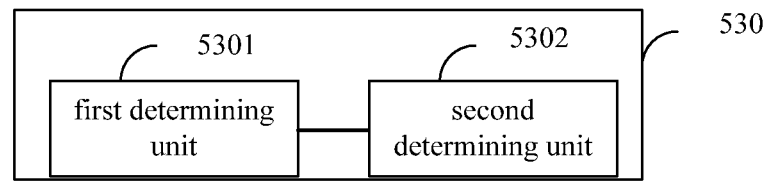

As shown in FIG. 5b, the filtering unit 530 may include a first filtering sub-unit 5301 and a second filtering sub-unit 5302. The first filtering sub-unit 5301 is configured to block the data request message in the case that it is determined through the HOOK function in the Application Programming Interface that the data requested by the data request message is a first type of data preset to be intercepted. The second filtering sub-unit 5302 is configured to return, in response to the data request message, second data different from the data requested by the data request message, as the data requested by the data request message when it is determined through the HOOK function in the Application Programming Interface that the data requested by the data request message is a second type of data preset to be intercepted.

Embodiment 6

Figure 6:
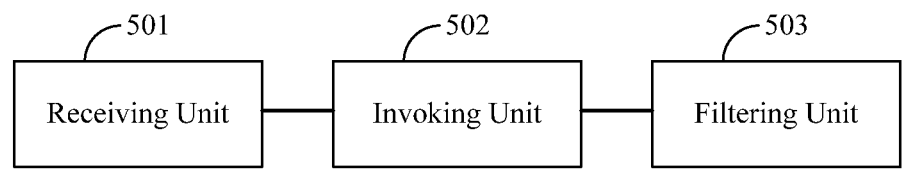
FIG. 6 is a schematic structure diagram of an apparatus for filtering data of a web page according to an embodiment of the invention.

To better implement the method, an apparatus for filtering data of a web page is further provided according to an embodiment of the present disclosure. As shown in FIG. 6, the apparatus for filtering the data of the web page includes: a receiving unit 501, an invoking unit 502 and a filtering unit 503. The receiving unit 501 is configured to receive a data request message sent through a browser. The data request message may be a link address, e.g., an URL, etc. The invoking unit 502 is configured to invoke a corresponding Application Programming Interface, e.g., API of "send", "recv", etc., based on the data request message received by the receiving unit 501. The Application Programming Interface includes a HOOK function, for example, codes of the HOOK function may be added in the head of codes of the Application Programming Interface. The filtering unit 503 is configured to filter the data request message with the HOOK function in the Application Programming Interface invoked by the invoking unit 502.

There are various approaches for filtering. For example, if it is detected that data requested by the data request message is data preset to be intercepted, directly blocking the data request message or returning a blank file to replace the data originally requested by the data request message, etc. For example, the filtering unit 503 may be configured to block the data request message when it is determined through the HOOK function in the Application Programming Interface that the data requested by the data request message is the data preset to be intercepted. The data to be intercepted may be set as required. For example, it may be set as an advertisement link, a game link or a link to install any unknown plug-in, etc.

Taking advertisement interception as an example, when the filtering unit 503 determines through the HOOK function in the Application Programming Interface that the data requested by the data request message is the advertisement link, the data request message may be blocked directly.

Alternatively, the filtering unit 503 may be configured to return a blank file as the data requested by the data request message based on the data request message when it is determined through the HOOK function in the Application Programming Interface that the data requested by the data request message is the data preset to be intercepted.

The data to be intercepted may be set as required. For example, it may be set as an advertisement link, a game link or a link to install any unknown plug-in, etc.

Taking advertisement interception as an example, when the filtering unit 503 determines through the HOOK function in the Application Programming Interface that the data requested by the data request message is the advertisement link (e.g., a JS file, an SWF file, etc.), a blank file may be returned in response to the data request message, to be taken as the data requested by the data request message, that is to say, to replace advertisement data originally requested by the data request message. In this way, the browser may presume that the advertisement data is already downloaded. Hence, the advertisement data is intercepted.

Optionally, in order to improve the flexibility and user experience, the approach for filtering may vary as the type of the data requested by the data request message varies. i.e., the filtering unit may include a first filtering sub-unit and a second filtering sub-unit.

The first filtering sub-unit is configured to block the data request message when it is determined through the HOOK function in the Application Programming Interface that the data requested by the data request message is a first type of data preset to be intercepted. The second filtering sub-unit is configured to return a blank file as the data requested by the data request message based on the data request message when it is determined through the HOOK function in the Application Programming Interface that the data requested by the data request message is a second type of data preset to be intercepted. The data to be intercepted may be set as required, for example, it may be set as an advertisement link, a game link or a link to install any unknown plug-in, etc.

Still taking advertisement interception as an example, the first type of data to be intercepted may be set as "a non-image advertisement link" and the second type of data to be intercepted may be set as "an image advertisement link." Therefore, the first filtering sub-unit is configured to block the data request message when it is determined through the HOOK function in the Application Program-ming Interface that the data requested by the data request message is the non-image advertisement link. Moreover, the second filtering sub-unit is configured to return, in response to the data request message, a blank image file as the data requested by the data request message, when it is determined through the HOOK function in the Application Programming Interface that the data requested by the data request message is the image advertisement link. In other words, the advertisement image originally requested by the data request message is replaced with the blank image file. In this way, the browser may presume that the advertisement image is already downloaded, and hence, the advertisement image is intercepted.

It should be noted that, if it is detected that the data requested by the data request message is not the data preset to be intercepted, the filtering unit 503 may obtain requested data based on the data request message, for which the description is omitted.

In addition, in order to improve the user experience, the user may be notified of the result of filtering. For example, the user may be notified of the object of filtering, detailed information of filtering, etc. Therefore, the apparatus for filtering the data of the web page may further include a notification unit configured to return the result of filtering to the user.

Taking advertisement interception as an example, the notification unit may be configured to return the result of filtering, e.g., the result of interception, detailed information of interception, etc. to the user so that the user may determine whether the interception is reasonable, and the user may further review the result of filtering by means of, for example, viewing logs, for which the description is omitted.

In practice, the foregoing units may be implemented as independent entities, or combined as one entity or multiple entities, e.g., implemented in the form of the browser injection module, the detection and interception module and the user notification module according to embodiments 2, 3 and 4, etc., for which the description is omitted.

The apparatus for filtering the data of the web page may be integrated in a client, where the client may be installed in a terminal, where the terminal may be a smart phone, a tablet computer, an e-book reader, a MP3 Player, a MP4 Player, a laptop, a desktop, etc.

Accordingly, in the apparatus for filtering the data of the web page according to the embodiment of the disclosure, the receiving unit 501 may receive the data request message sent through the browser by the user, the invoking unit 502 invokes the corresponding Application Programming Interface based on the data request message, where the Application Programming Interface includes the HOOK function, and then the filtering unit 503 filters the data request message is by using the HOOK function in the Application Programming Interface; since almost all kinds of browsers may utilize Application Programming Interface(s) for requesting data, the solution has good compatibility, no specific plug-ins need to be developed for various browsers, no post-maintenance is required, the workload of development is small and the implementation is flexible.

Embodiment 7

Correspondingly, a communication system including an apparatus for filtering data of a web page according to any of the embodiments of the invention is provided according to this embodiment of the disclosure, where the apparatus for filtering the data of the web page may be referred to embodiment 6. For example, the apparatus for filtering the data of the web page may be integrated in a client as follows.

The client is configured to receive a data request message sent through a browser; invoke a corresponding Application Programming Interface based on the data request message, where the Application Programming Interface includes a HOOK function; and filter the data request message with the HOOK function in the Application Programming Interface. The detail is not given here and reference may be made to foregoing embodiments.

In addition, the communication system may further include a server. The server is configured to provide the client with a rule for filtering. The client may be configured to obtain the rule for filtering from the server, and filter the data request message based on the rule for filtering by using the HOOK function in the Application Programming Interface.

Taking advertisement interception as an example, the server may save and maintain an advertisement rule library and offer the advertisement rule library to the client; and the client may detect the data request message based on the advertisement rule library by using the HOOK function in the invoked Application Programming Interface to determine whether data requested by the data request message is an advertisement link, and process the data request message based on the result of detection. The detail is not given here and reference may be made to foregoing embodiments.

The communication system has the same advantages as the apparatus for filtering the data of the web page according to the embodiments of the invention, for which the description is omitted.

Embodiment 8

Figure 7:
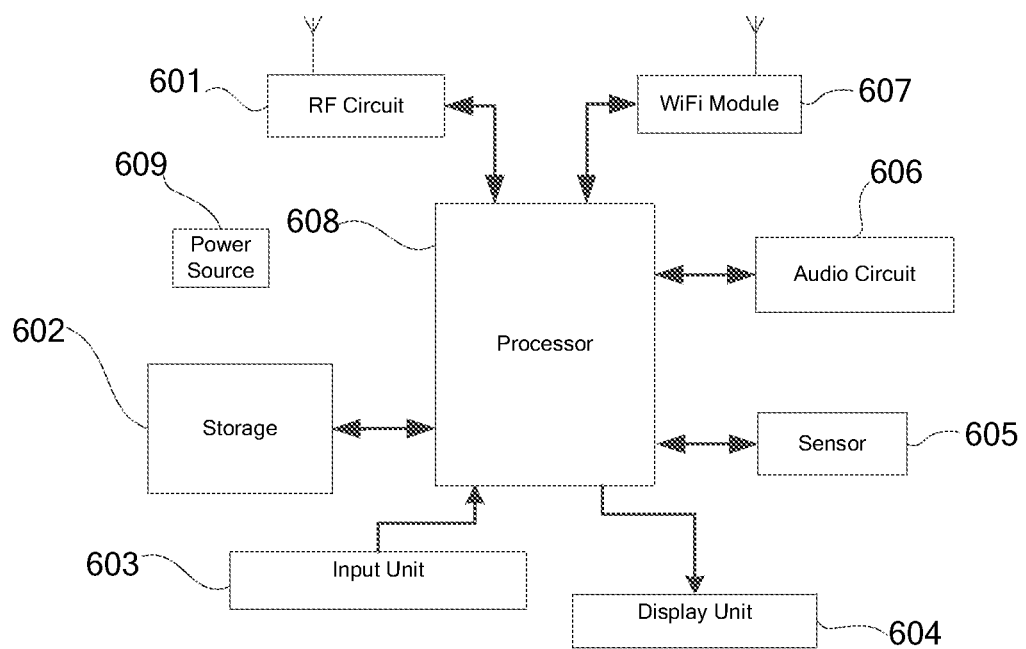
FIG. 7 is a schematic structure diagram of a terminal according to an embodiment of the invention.

Correspondingly, a terminal is provided according to an embodiment of the disclosure. As shown in FIG. 7, the terminal may include: a Radio frequency (RF) circuit 601, a storage 602 including one or more computer readable storage mediums, an input unit 603, a display unit 604, a sensor 605, an audio circuit 606, a Wireless Fidelity (WiFi) module 607, a processor 608 including one or more processing cores, and a power source 609, etc. It should be understood by those skilled in the art that, a structure of the terminal shown in FIG. 7 is not intended to limit the terminal, more or less components than shown in FIG. 7 may be included in the terminal, some components may be combined, or the components may be in another arrangement.

The RF circuit 601 may be configured to receive and send signals during receiving and sending messages or making a phone call, and in particular, deliver downlink information of a base station to one or more processors 608 to process and send uplink data to the base station. The RF circuit 601 usually includes, but not limited to, an antenna, at least one amplifier, a tuner, one or more oscillators, a Subscriber Identity Module (SIM) card, a transceiver, a coupler, a Low Noise Amplifier (LNA), a duplexer, etc. In addition, the RF circuit 601 may communicate with a network or other devices through wireless communication. The wireless communication may be performed according to any communication standard or protocol, including but not limited to: Global System of Mobile communication (GSM), General Packet Radio Service (GPRS), Code Division Multiple Access (CDMA), Wideband Code Division Multiple Access (WCDMA), Long Term Evolution (LTE), Email, Short Messaging Service (SMS), etc.

The storage 602 may be configured to store software program(s) and module(s), the processor 608 executes various applications and data processing by running the software program(s) and module(s) stored in the storage 602. The storage 602 may mainly include program storage area and data storage area, where the program storage area may store an operating system, an application program required for at least one function (e.g., a function of playing audio, a function of displaying image, etc.), etc.; the data storage area may store data (e.g., audio data, telephone book, etc.) created based on the usage of the terminal, etc. In addition, the storage 602 may include a high speed random access memory, a nonvolatile storage, e.g., at least one magnetic disk storage or flash disk, and any solid volatile storage. Correspondingly, the storage 602 may include a storage controller, which is configured to enable the processor 608 and the input unit 603 to access the storage 602.

The input unit 603 may be configured to receive an input number or input character information, and implement input of a signal, which is correlated to user configuration and function control, input through a keyboard, a mouse, an operating rod, an optical input device or a trackball. According to a specific embodiment of the disclosure, the input unit 603 may include a touch-sensitive surface and any other input device. The touch-sensitive surface, also known as a touch screen or touch panel, may capture a touch operation on or nearby the surface (e.g., an operation on or near the touch-sensitive surface performed by a user with a finger, a stylus or any suitable object or accessory), and drive a corresponding connection means based on a preset program. Optionally, the touch-sensitive surface may include two components: a touch detection apparatus and a touch controller. The touch detection apparatus is configured to detect a touch position, detect the signal caused by the touch operation, and send the signal to the touch controller; the touch controller is configured to receive touch information from the touch detection apparatus, convert the touch information into coordinates of the touch position, send the coordinates to the processor 608, and receive and execute a command from the processor 608. In addition, the touch-sensitive surface may be implemented in many types, e.g., a resistance type, an infrared type, a Surface Acoustic Wave type, etc. Besides the touch-sensitive surface, the input unit 603 may include any other input device. Specifically, the any other input device includes but not limited to: any one of a physical keyboard, a function key (e.g., a key for controlling volume, an ON/OFF key, etc.), a trackball, a mouse and an operating rod or a combination thereof.

The display unit 604 is configured to display information input by the user, information provided to the user and various graphic user interfaces of the terminal, where those graphic user interfaces may consists of image, text, icon, video and any combination thereof. The display unit 604 may include a display panel, and optionally, the display panel may be in forms of a Liquid Crystal Display (LCD), an Organic Light-Emitting Diode (OLED), etc. Furthermore, the touch-sensitive surface may cover the display panel, after the touch operation is detected on or near the touch-sensitive surface, the touch information is sent to the processor 608 to determine the type of a touch event, then the processor 608 provides a corresponding visual output on the display panel based on the type of the touch event. Although in FIG. 7, the touch-sensitive surface and the display panel are implemented as two independent components to achieve input and output functions, the touch-sensitive surface and the display panel may be integrated together to achieve input and output functions according to some embodiments of the disclosure.

The terminal may further include at least one sensor 605, e.g., an optical sensor, a motion sensor and any other sensor. Specifically, the optical sensor may include an ambient light sensor and a proximity sensor, where the ambient light sensor may adjust the brightness of the display panel based on the intensity of ambient light, and the proximity sensor may turn off the display panel and/or a backlight when the terminal is moved near to an ear. As one kind of the motion sensor, a gravity acceleration sensor may detect values of accelerations on all directions (usually three-axis) and detect the value and direction of the gravity when remaining stationary. The gravity acceleration sensor may be applied in an application for recognizing posture of a mobile phone (for example, switching between landscape and portrait, relevant games, magnetometer pose calibration), a function related to vibration recognition (for example, a pedometer, knocking), etc.; in addition, other sensors, e.g., a gyroscope, a barometer, a hygrometer, a thermometer, an infrared sensor, etc. may be further provided in the terminal, the description of which is omitted herein.

The audio circuit 606, a loudspeaker and a microphone may provide an audio interface between the user and the terminal The audio circuit 606 may transmit an electric signal converted from received audio data to the loudspeaker, and a voice signal is converted from the electric signal and is output by the loudspeaker; on the other hand, the microphone converts captured voice signal into an electric signal, the electric signal is received by the audio circuit 606 and converted into audio data, the audio data is output to the processor 608 to process and then sent to, for example, another device via the RF circuit 601. Alternatively, the audio data is output to the storage 602 for further processing. The audio circuit 606 may further include a headset jack through which an external earphone and the terminal may be connected.

WiFi is a technology for short distance wireless transmission. With the WiFi module 607, the terminal may insist the user in receiving and sending an email, browsing a web page, accessing a stream media, etc., and a wireless broadband Internet access is provided to the user. Although the WiFi module 607 is shown in FIG. 7, it should be understood that the WiFi module is not indispensable in the terminal and may be omitted without changing the essence of the disclosure.

The processor 608, as a control center of the terminal, is connected all components of the whole mobile phone via various interfaces and wires, monitors the whole mobile phone by running or executing the software program(s) and/or module(s) stored in the storage 602, invokes the data stored in the storage 602, executes various functions of the terminal and processes the data. Optionally, the processor 608 may include one or more processing cores; preferably, the processor 608 may be integrated with an application processor and a modem processor, where the application processor is mainly responsive of processing involved with the operating system, the user interface, the applications, etc. and the modem processor is mainly responsive of processing involved with the wireless communication. It may be understood that, the modem processor may not be integrated in the processor 608.

The terminal further includes the power source 609 (such as a battery) providing power to all the components. Preferably, the power source may be connected to the processor 608 logically through a power management system in order to implement functions of charging management, discharging management, power consumption management, etc. The power source 609 may further include one or more direct-current or alternating current power sources, a recharging system, a power failure detection circuit, a power adapter or inverter, a power status indicator, etc.

While not shown and described in the specification, the terminal may include, for example, a camera, a Bluetooth module. According to the embodiment of the disclosure, the processor 608 in the terminal implements various functions by loading executable files corresponding to one or more processes of an application into the storage 602 and running the application stored in the storage 602 by the processor 608.

While not shown and described in the specification, the terminal may further include, for example, a camera, a Bluetooth module. According to the embodiment of the disclosure, the display unit of the terminal is a touch screen display. The terminal further includes a storage and one or more programs stored in the storage, and is configured to perform the following operations by instructing the one or more processors to execute the one or more programs: receiving a data request message sent by the user through a browser; invoking a corresponding Application Programming Interface based on the received data request message, where the Application Programming Interface includes a HOOK function; filtering the data request message with the HOOK function in the Application Programming Interface.

There are various approaches for filtering. For example, if it is detected that data requested by the data request message is data preset to be intercepted, the data request message may be directly blocked or a blank file to replace the data originally requested by the data request message may be returned. For instance, the filtering may as follows.

(1) When it is determined through the HOOK function in the Application Programming Interface that, the data requested by the data request message is the data preset to be intercepted, the data request message is blocked.

The data to be intercepted may be set as required, for example, it may be set as an advertisement link, a game link or a link to install any unknown plug-in, etc.

Taking advertisement interception as an example, when it is determined through the HOOK function in the Application Programming Interface that the data requested by the data request message is the advertisement link, the data request message may be blocked directly.

(2) When it is determined through the HOOK function in the Application Programming Interface that the data requested by the data request message is the data preset to be intercepted, a blank file is returned in response to the data request message, to be taken as the data requested by the data request message.

The data to be intercepted may be set as required, for example, it may be set as an advertisement link, a game link or a link to install any unknown plug-in, etc.

Taking advertisement interception as an example, when it is determined through the HOOK function in the Application Programming Interface that the data requested by the data request message is the advertisement link (e.g., a JS file, an SWF file, etc.), a blank file may be returned in response to the data request message, to be taken as the data requested by the data request message, i.e., to replace the advertisement data originally requested by the data request message. In this way, the browser may presume that the advertisement data is already downloaded. Hence, the advertisement data is intercepted.

(3) Optionally, in order to improve the flexibility and user experience, the approach for filtering may vary as the type of the data requested by the data request message varies. For example, the filtering may include:

A: when it is determined through the HOOK function in the Application Programming Interface that the data requested by the data request message is a first type of data preset to be intercepted, blocking the data request message;

B: when it is determined through the HOOK function in the Application Programming Interface that the data requested by the data request message is a second type of data preset to be intercepted, returning, in response to the data request message, a blank file as the data requested by the data request message.

The data to be intercepted may be set as required, for example, it may be set as an advertisement link, a game link or a link to install any unknown plug-in, etc.

Still taking advertisement interception as an example, the first type of data to be intercepted may be set as "a non-image advertisement link" and the second type of data to be intercepted may be set as "an image advertisement link." Therefore, the steps for filtering may include: blocking the data request message, when it is determined through the HOOK function in the Application Programming Interface that the data requested by the data request message is the non-image advertisement link; and returning, in response to the data request message, a blank image file as the data requested by the data request message, when it is determined through the HOOK function in the Application Programming Interface that the data requested by the data request message is the image advertisement link. In other words, the advertisement image originally requested by the data request message is replaced with the blank image file. In this way, the browser may presume that the advertisement image is already downloaded, hence, the advertisement image is intercepted.

It should be noted that, if it is detected that the data requested by the data request message is not the data preset to be intercepted, the method proceeds to obtain the requested data based on the data request message.

In addition, the result of filtering may be returned to the user optionally. Taking advertisement interception as an example, the result of filtering, e.g., the result of interception, detailed information of interception, etc., may be returned to the user so that the user may determine whether the interception is reasonable, and the user may further review the result of filtering by means of, for example, viewing logs.

Accordingly, in the terminal according to the embodiment of the invention, the data request message sent through the browser by the user is received, the corresponding Application Programming Interface is invoked based on the data request message, where the Application Programming Interface includes the HOOK function, and the data request message is filtered by using the HOOK function in the Application Programming Interface; since almost all kinds of browsers may utilize Application Programming Interface (s) for requesting data, the solution has good compatibility, no specific plug-ins need to be developed for various browsers, no post-maintenance is required, the workload of development is small and the implementation is flexible.

It should be understood by those skilled in the art that all or some of the steps in the methods according to the embodiments of the disclosure may be performed by a corresponding hardware instructed with a program. The program may be stored in a computer readable storage medium. The computer readable storage medium may include Read Only Memory (ROM), Random Access Memory (RAM), magnetic disk, Compact Disk, etc.

The method, apparatus and system for filtering the data in a web page according to the embodiments of the invention are described in detail. The principle and implementation of the disclosure are illustrated with specific examples, which are set forth only for the purpose of better understanding of the method and core concept of the disclosure; changes to the specific embodiments and the application scope may be made by those skilled in the art based on the spirit of the disclosure, and the specification is not intended to limit the disclosure.

What is claimed is:

1. A method for filtering data of a web page, comprising:
    receiving a data request message sent through a browser;
    invoking a corresponding Application Programming Interface based on the data request message, wherein the application programming interface comprises a HOOK function; and
    filtering the data request message with the HOOK function in the Application Programming Interface, wherein the step of filtering the data request message with the HOOK function in the Application Programming Interface comprises:
    blocking the data requested by the data request message in the case that it is determined through the HOOK function in the Application Programming Interface that the data requested by the data request message is a first type of data preset as to be intercepted; and
    returning, in response to the data request message, a blank file as the data requested by the data request message, in the case that it is determined through the HOOK function in the Application Programming Interface that the data requested by the data request message is a second type of data preset as to be intercepted,
    wherein, each of the first type of data preset as to be intercepted and the second type of data preset as to be intercepted is an advertisement link, a game link or a link to install an unknown plug-in, and the first type of the data preset as to be intercepted is different from the second type of the data preset as to be intercepted.

2. The method according to claim 1, wherein the step of filtering the data request message with the HOOK function in the Application Programming Interface comprises:
    blocking the data request message in the case that it is determined through the HOOK function in the Application Programming Interface that data requested by the data request message is a first type of data preset as to be intercepted; and
    returning, in response to the data request message, second data different from the data requested by the data request message, as the data requested by the data request message in the case that it is determined through the HOOK function in the Application Programming Interface that the data requested by the data request message is a second type of data preset as to be intercepted.

3. The method according to claim 2, wherein
    the step of blocking the data request message in the case that it is determined through the HOOK function in the Application Programming Interface that the data requested by the data request message is the first type of data preset as to be intercepted comprises: blocking the data request message in the case that it is determined through the HOOK function in the Application Programming Interface that the data requested by the data request message is a non-image advertisement link; and
    the step of returning, in response to the data request message, the second data different from the data requested by the data request message, as the data requested by the data request message in the case that it is determined through the HOOK function in the Application Programming Interface that the data requested by the data request message is the second type of data preset as to be intercepted comprises:
returning, in response to the data request message, the second data as the data requested by the data request message in the case that it is determined through the HOOK function in the Application Programming Interface that the data requested by the data request message is an image advertisement link.

4. The method according to claim 1, wherein after the step of filtering the data request message with the HOOK function in the Application Programming Interface, the method further comprises:
returning a result of the filtering.

5. An apparatus for filtering data of a web page, comprising:
a receiving unit, configured to receive a data request message sent through a browser;
an invoking unit, configured to invoke a corresponding Application Programming Interface based on the data request message, wherein the Application Programming Interface comprises a HOOK function; and
a filtering unit, configured to filter the data request message with the HOOK function in the Application Programming Interface, wherein
the filtering unit is further configured to
block the data requested by the data request message in the case that it is determined through the HOOK function in the Application Programming Interface that the data requested by the data request message is a first type of data preset as to be intercepted; and
return, in response to the data request message, a blank file as the data requested by the data request message, in the case that it is determined through the HOOK function in the Application Programming Interface that the data requested by the data request message is a second type of data preset as to be intercepted,
wherein, each of the first type of data preset as to be intercepted and the second type of data preset as to be intercepted is an advertisement link, a game link or a link to install an unknown plug-in, and the first type of the data preset as to be intercepted is different from the second type of the data preset as to be intercepted.

6. The apparatus for filtering the data of the web page according to claim 5, wherein the filtering unit comprises a first filtering sub-unit and a second filtering sub-unit;
the first filtering sub-unit is configured to block the data request message in the case that it is determined through the HOOK function in the Application Programming Interface that data requested by the data request message is a first type of data preset as to be intercepted; and
the second filtering sub-unit is configured to return, in response to the data request message, second data different from the data requested by the data request message, as the data requested by the data request message in the case that it is determined through the HOOK function in the Application Programming Interface that the data requested by the data request message is a second type of data preset as to be intercepted.

7. The apparatus for filtering the data of the web page according to claim 6, wherein
the first filtering sub-unit is further configured to block the data request message in the case that it is determined through the HOOK function in the Application Programming Interface that the data requested by the data request message is a non-image advertisement link;
the second filtering sub-unit is further configured to return, in response to the data request message, the second data different from the data requested by the data request message, as the data requested by the data request message in the case that it is determined through the HOOK function in the Application Programming Interface that the data requested by the data request message is an image advertisement link.

8. The apparatus for filtering the data of the web page according to claim 5, wherein the apparatus further comprises:
a notification unit, configured to return a result of the filtering.

9. A method for filtering data of a web page, comprising:
determining an Application Programming Interface invoked by a data request message, wherein the application programming interface comprises a HOOK function;
determining, based on the HOOK function in the Application Programming Interface, data requested by the data request message; and
filtering the data requested by the data request message wherein the step of filtering the data request message comprises:
blocking the data requested by the data request message in the case that it is determined through the HOOK function in the Application Programming Interface that the data requested by the data request message is a first type of data preset as to be intercepted; and
returning, in response to the data request message, a blank file as the data requested by the data request message, in the case that it is determined through the HOOK function in the Application Programming Interface that the data requested by the data request message is a second type of data preset as to be intercepted,
wherein, each of the first type of data preset as to be intercepted and the second type of data preset as to be intercepted is an advertisement link, a game link or a link to install an unknown plug-in, and the first type of the data preset as to be intercepted is different from the second type of the data preset as to be intercepted.

* * * * *